US011854154B1

(12) United States Patent
Monaghan

(10) Patent No.: US 11,854,154 B1
(45) Date of Patent: Dec. 26, 2023

(54) SYSTEMS AND METHODS FOR SYNCHRONIZING THE SCANNING OF A SCENE WITH THE VIEWING OF THE SCAN RESULTS RELATIVE TO A LIVE VIEW OF THE SCENE

(71) Applicant: Illuscio, Inc., Culver City, CA (US)

(72) Inventor: Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/364,591

(22) Filed: Aug. 3, 2023

Related U.S. Application Data

(63) Continuation of application No. 18/048,316, filed on Oct. 20, 2022, now Pat. No. 11,727,655.

(51) Int. Cl.
*G06T 19/00* (2011.01)
*G06T 7/70* (2017.01)
*G06T 19/20* (2011.01)
*G06T 7/50* (2017.01)

(52) U.S. Cl.
CPC .............. *G06T 19/006* (2013.01); *G06T 7/50* (2017.01); *G06T 7/70* (2017.01); *G06T 19/20* (2013.01); *G06T 2207/10028* (2013.01); *G06T 2219/2004* (2013.01)

(58) Field of Classification Search
None
See application file for complete search history.

(56) References Cited

U.S. PATENT DOCUMENTS

2016/0323565 A1   11/2016   van Baarsen et al.
2020/0090453 A1   3/2020    Nelson

*Primary Examiner* — Robert J Craddock
(74) *Attorney, Agent, or Firm* — Ansari Katiraei LLP; Arman Katiraei; Sadiq Ansari

(57) ABSTRACT

Disclosed is a three-dimensional ("3D") scanning system that synchronizes the scanning of a scene with the viewing of the scan results relative to a live view of the scene. The system includes a first device that scans a first set of surfaces that are exposed to the first device from a first position. The system further includes a second device that receives the scan data as it is generated for each scanned surface of the first set of surfaces. The second device augments a visualization of a second set of surfaces, within a field-of-view of the second device from a second position, with the scan data that is generated for a subset of scanned surfaces from the first position corresponding to one or more surfaces of the second set of surfaces visualized from the second position.

20 Claims, 8 Drawing Sheets

SYSTEMS AND METHODS FOR SYNCHRONIZING THE SCANNING OF A SCENE WITH THE VIEWING OF THE SCAN RESULTS RELATIVE TO A LIVE VIEW OF THE SCENE

CLAIM OF BENEFIT TO RELATED APPLICATIONS

This application is a continuation of United States nonprovisional application Ser. No. 18/048,316 entitled "Systems and Methods for Synchronizing the Scanning of a Scene with the Viewing of the Scan Results Relative to a Live View of the Scene", filed Oct. 20, 2022 and issued as U.S. Pat. No. 11,727,655. The contents of application Ser. No. 18/048,316 are hereby incorporated by reference.

BACKGROUND

Depth or positional scanners use time-of-flight ("ToF"), index of refraction, intensity returns, and/or other techniques to accurately map the positions of points along different surfaces in a scene to a three-dimensional ("3 D") space. A scanner cannot map the points about a surface that is partially or wholly blocked or obscured from the scanner.

The difficulty with producing a comprehensive, complete, and accurate scan of a scene is that the results of the scan are not seen until the scanning is complete. For instance, a user places the scanner at a first position, waits several seconds or minutes for the scanner to scan the scene from the first position, waits additional time for a rendered visualization of the scan results, manually analyzes the rendered visualization to detect blocked or improperly scanned surfaces, and repositions the scanner to capture the blocked or improperly scanned surfaces from a more exposed and unobstructed second position.

DETAILED DESCRIPTION OF PREFERRED EMBODIMENTS

The following detailed description refers to the accompanying drawings. The same reference numbers in different drawings may identify the same or similar elements.

Provided are systems and methods for synchronizing the scanning of a scene with the viewing of the scan results relative to a live view of the scene. The systems and methods include a first device that scans the scene from a first position and that streams the scan results to a second device that views the scene from a different second position. The second device creates an augmented reality, mixed reality, or virtual reality visualization of the scene that presents the scene from the second position overlaid with the scan results of any surfaces scanned with the first device that are within the view of the scene from the second position. In other words, the second device overlays the scan results of scanned surfaces onto corresponding surfaces that appear in the live view of the scene from the second position. From this visualization of the scene, one or more users are able to scan the scene, simultaneously view the scan results from different perspectives than those being used to capture the scene, detect surfaces that are improperly scanned or blocked from the scanning at the first position, and modify the scanning position as the scanning is still taking place to obtain a comprehensive, complete, and accurate scan of the entire scene at one time and/or of a particular region of the scene before moving on to scanning of a next region of the scene.

Figure 1:
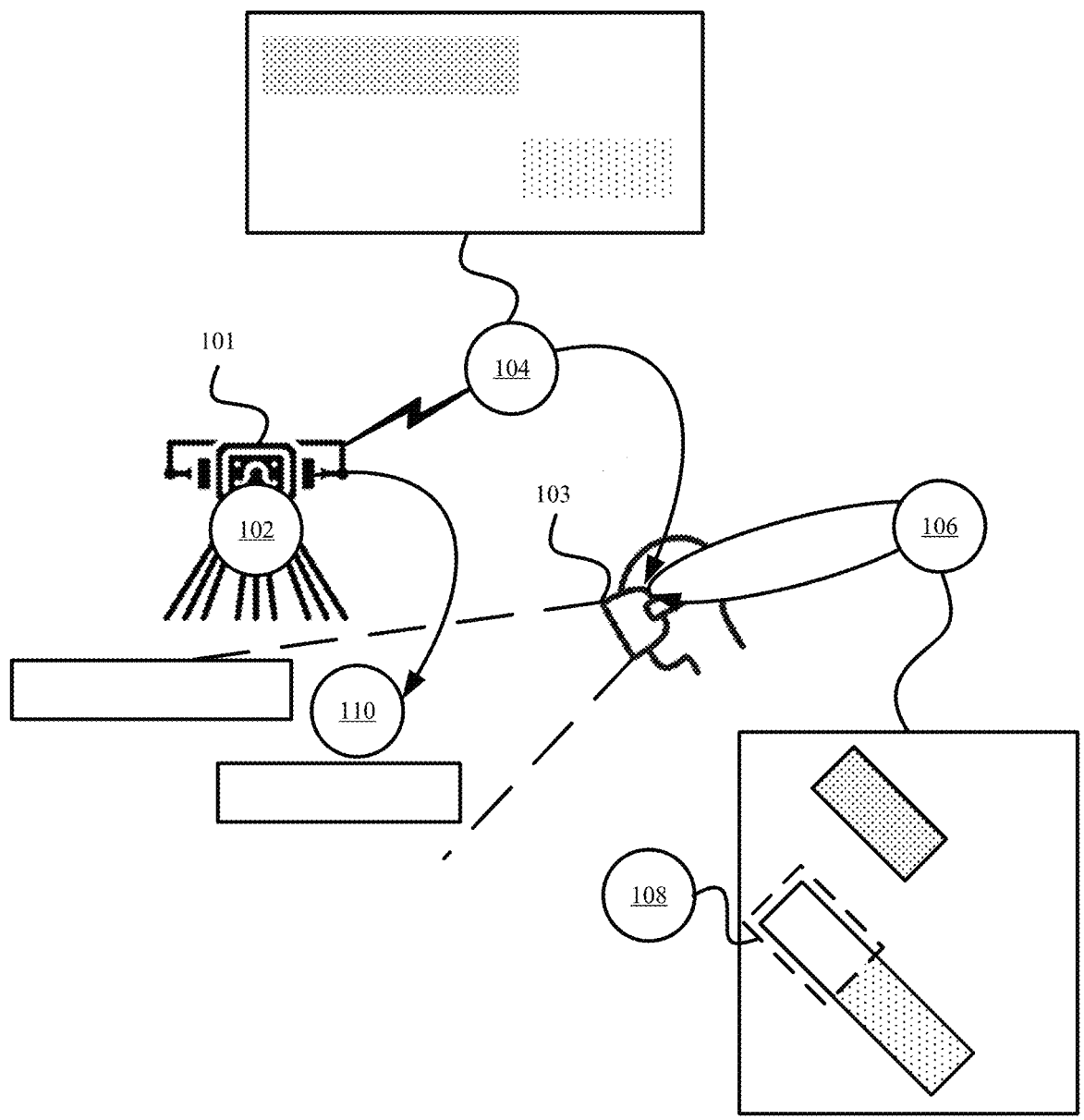
FIG. 1 illustrates an example of synchronizing the scanning of a scene from a first position with the viewing of the scan results from a different second position in accordance with some embodiment presented herein.

FIG. 1 illustrates an example of synchronizing the scanning of a scene from a first position with the viewing of the scan results from a different second position in accordance with some embodiment presented herein. First device 101 scans (at 102) the scene from a first position. Scanning (at 102) the scene includes generating a three-dimensional ("3 D") model of the scene by mapping the position of different points that are scanned about surfaces of the scene to a 3 D space. Scanning (at 102) the scene may also include capturing the descriptive characteristics (e.g., color values) for the different points, and attributing the descriptive characteristics to corresponding points of the 3 D model in the 3 D space.

First device 101 streams (at 104) the scan results to second device 103. In some embodiments, first device 101 streams (at 104) the scan results to second device 103 as they are generated by sensors of first device 101. Streaming (at 104) the scan results includes wirelessly transmitting the scan results to second device 103 over a Bluetooth, WiFi, or another wireless connection or wireless network.

Second device 103 produces (at 106) a live view of the scene from a second position that is augmented with the scan results. The second position is different than the first position, and may present the scene from a different spatial distance, location, angle, orientation, and/or other perspective than the first position.

The live view presents the scene from a field-of-view that is established from the second position. Second device 103 may include a semi-transparent lens through which the scene from the field-of-view at the second position is presented. Alternatively, second device 103 may include one or more cameras that capture images of the scene from the field-of-view at the second position, and a display that presents the captured images.

Producing (at 106) the live augmented view of the scene includes presenting the scan results for any surfaces that are scanned by first device 101 from the first position and that are visible in the live view of the scene from the second position over the live view of those surfaces. In some embodiments, producing (at 106) the live augmented view includes aligning the scan results of a particular surface from a first position with the position and/or orientation of that particular surface from the second position, and creating an augmented or enhanced visualization of the particular surface that overlays the scan results over the corresponding aligned points of the particular surface.

From the augmented or enhanced visualization and/or changing of the second position from which the scene is visualized, a user inspects the scan to detect points, surfaces, or regions that were improperly scanned from the first position. In other words, the user analyzes the scan results from the second position and/or different perspectives while simultaneously continuing with the scanning of the scene.

The user detects (at 108) a gap in the live augmented view produced (at 106) for a particular surface of the scene. The gap may include a region, part, or all of the particular surface that is not augmented or enhanced with scan data or where the augmented or enhanced scan data does not satisfy a density threshold or quality threshold.

In response to detecting (at 108) the gap, the user may modify (at 110) the position of first device 101 to better expose the particular surface to first device 101 and/or to remove any obstructions that prevented the proper scanning of the particular surface. Once repositioned, the particular surface may be rescanned with first device 101, and the new scan results may be streamed to second device 103 where the live augmented view is updated to present the scan results for the particular surface.

First device 101 and second device 103 are part of a 3D scanning system that allows scanning of the scene with first device 101 from a first position while simultaneously viewing the scan results with second device 103 from a second position and/or various different perspectives than the one provided from the first position. Consequently, users do not have to wait until the scans are complete before the quality of the scans are analyzed. The users can detect issues with the scans as the scan results are being generated, and can inspect the scene in conjunction with the scan results to determine the next position from which to scan the scene.

Figure 2:
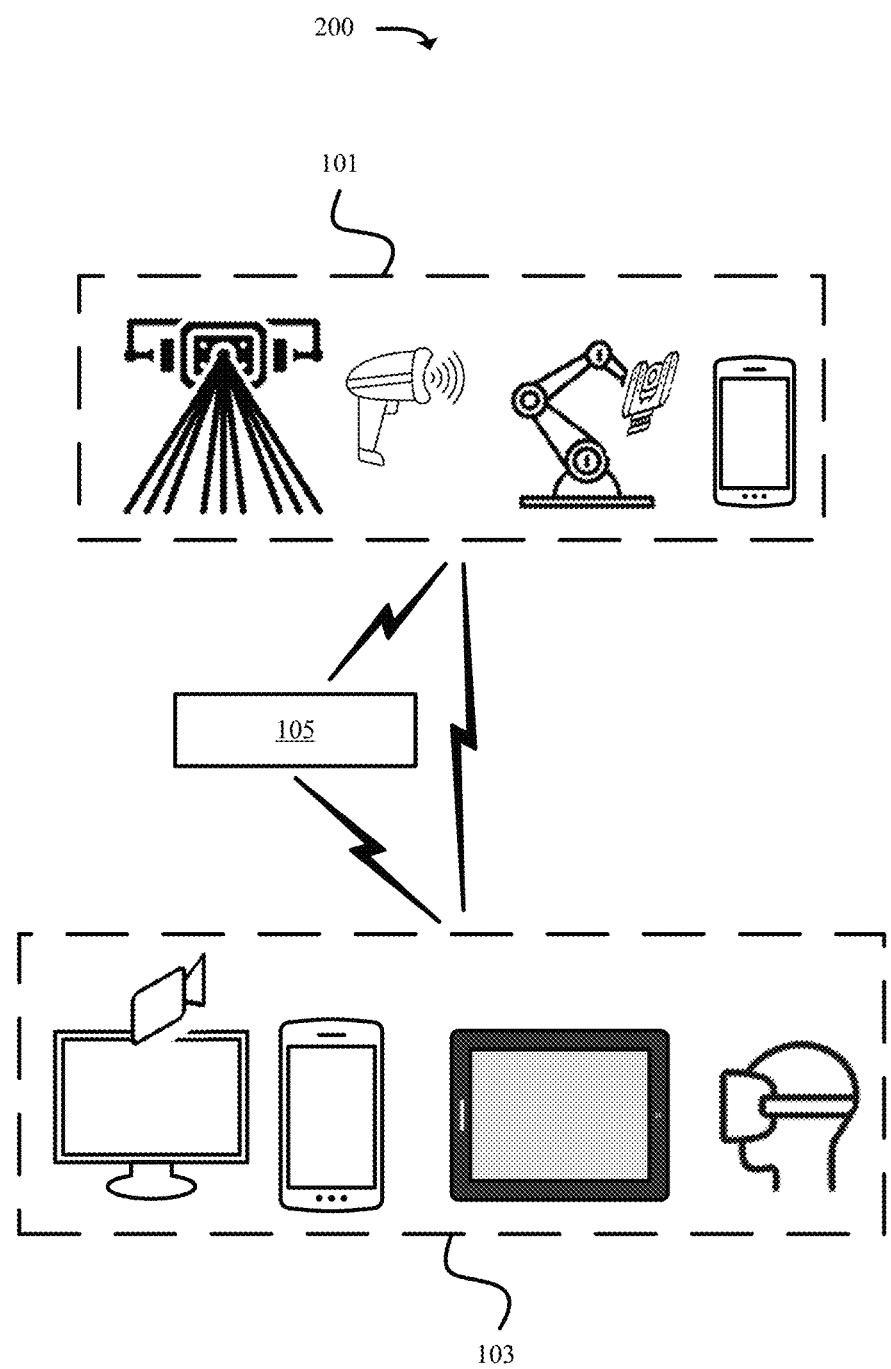
FIG. 2 illustrates an example architecture for the 3 D scanning system in accordance with some embodiments presented herein.

FIG. 2 illustrates example architecture 200 for the 3D scanning system in accordance with some embodiments presented herein. Example architecture 200 includes first device 101 and second device 103.

First device 101 includes one or more depth or positional scanners. Each depth or positional scanner uses time-of-flight ("ToF"), index of refraction, intensity returns, and/or other techniques to accurately map the positions of points along different surfaces in a scene. In some embodiments, first device 101 corresponds to a Light Detection and Ranging ("LiDAR") scanner, Magnetic Resonance Imaging ("MRI") scanner, Positron Emission Tomography ("PET") scanner, Computerized Tomography ("CT") scanner, ToF sensor, structured or patterned light imaging device, and/or other device that emits lasers, light, sound, and/or other signaling to accurately measure the position of different points on different surfaces of the scene.

Accordingly, first device 101 includes one or more signal emitters and sensors for the surface detection and positional mapping of the detected surfaces. In some embodiments, the signal emitters include lasers and/or projectors that emit wavelengths at one or more wavelengths of the electromagnetic spectrum. In some such embodiments, the sensors measure the ToF, index of refraction, intensity values, and/or other properties of the emitted signals, and convert the measurements into distance or positional measurements for the surfaces that the emitted signals interact with or reflect off. In some other embodiments, the signal emitters include projectors that project a structured light pattern onto the surfaces of the scene. In some such embodiments, the sensors measure distortions to the structured light pattern as they appear on different surfaces, and convert the distortions into distance or positional measurements of those surfaces.

First device 101 includes positional sensors for the spatial tracking of first device 101. For instance, the positional sensors include accelerometers, inertial measurement unit ("IMU") sensors, gyroscopes, global positional system ("GPS") circuits, signal triangulation sensors, and/or other sensors for tracking the movements, rotations, orientations, and/or other positioning associated with first device 101.

In some embodiments, first device 101 scans the scene from a first position or a first set of positions based on a manual positioning of first device 101. For instance, first device 101 may include a handheld depth or positional scanner that scans the scene from the handheld positions. In some embodiments, the cameras and/or LiDAR scanners of a mobile device may be used as the depth or positional scanner.

In some other embodiments, first device 101 scans the scene from the first position based on a fixed or set positioning of first device 101, or from the first set of positions based on automated movement of first device 101. For instance, first device 101 may be attached to a tripod that fixes the first position from which the scene is scanned. Alternatively, first device 101 may be mounted to a motorized rig, robotic arm, drone, or other moveable element that positions first device 101 at each position of the first set of positions to obtain multiple scans of the scene from those different positions.

Second device 103 is a display device that presents a live view of the scene and that augments the live view based on the scanning results that are obtained from first device 101. In some embodiments, second device 103 is an augmented reality, mixed reality, or virtual reality headset. The headset presents a live view of the scene as seen from the perspective or second position of the headset. In some embodiments, the headset uses one or more cameras to capture the live of the scene and to present the live view on a display. The headset augments the live view by receiving the scanned data from first device 101, by aligning the scanned data with the surfaces that are within the live view, and by overlaying the scanned data that is captured for one or more of the surface that are within the live view. Accordingly, the headset includes a display for presented the augmented live view of the scene that is enhanced with the scanned data from first device 101. In some embodiments, second device 103 is a display that is connected to a camera. The display presents the camera field-of-view and/or acts as a viewfinder of the camera. The display is augmented or enhanced to overlay the scanned data that is obtained for the surfaces presented in the live view.

In some embodiments, second device 103 includes one or more sensors or cameras for tracking its own positioning and/or the positioning of first device 101. In some such embodiments, the one or more sensors or cameras track the positioning of first device 101 relative to second device 103 and/or the scene. For instance, the cameras of second device 103 track the distance, orientation, and/or other positional properties of first device 101 relative to second device 103 in order to align the scanned data obtained from first device 101 relative to the live view of the scene captured and/or presented by second device 103.

First device 101 and second device 103 are connected to one another via wired or wireless means. For instance, each of first device 101 and second device 103 includes a wireless radio for the streaming of the scan results and/or positional information from first device 101 to second device 103.

In some embodiments, the augmented and/or enhanced visualization of the live view with the scan results is generated by second device 103. In some such embodiments, one or more hardware processors of second device 103 receive the scan results from first device 101, align the scan results with the live view presented by second device 103, and overlay the scan results over corresponding surfaces represented by the scan results.

In some other embodiments, the augmented and/or enhanced visualization of the live view is generated by system device 105. System device 105 includes one or more machines or servers that receive the scan results from first device 101, the live view of the scene from second device 103, and the positional information from first device 101 and second device 103, and that generate the augmented and/or enhanced visualization of the live view with the scan results based on the received data from first device 101 and second device 103. System device 105 streams the augmented and/or enhanced visualization to second device 103 for display.

Aligning the scan results with the surfaces in the live view and/or generating the augmented and/or enhanced visualization based on the relative tracking of first device 101 and second device 103 provides the same accuracy with significantly less computational overhead than aligning the scan results to corresponding points in live view. In other words, second device 103 does not match the positioning and/or structures of the surfaces represented by the scan results with the positioning and/or structures of the features or surfaces captured within the live view. Instead, second device 103 aligns the scan results received from first device 101 with the live view that is captured by second device 103 as a result of tracking the changes in the position and orientation of first device 101 relative to the position and orientation of second device 103.

Figure 3:
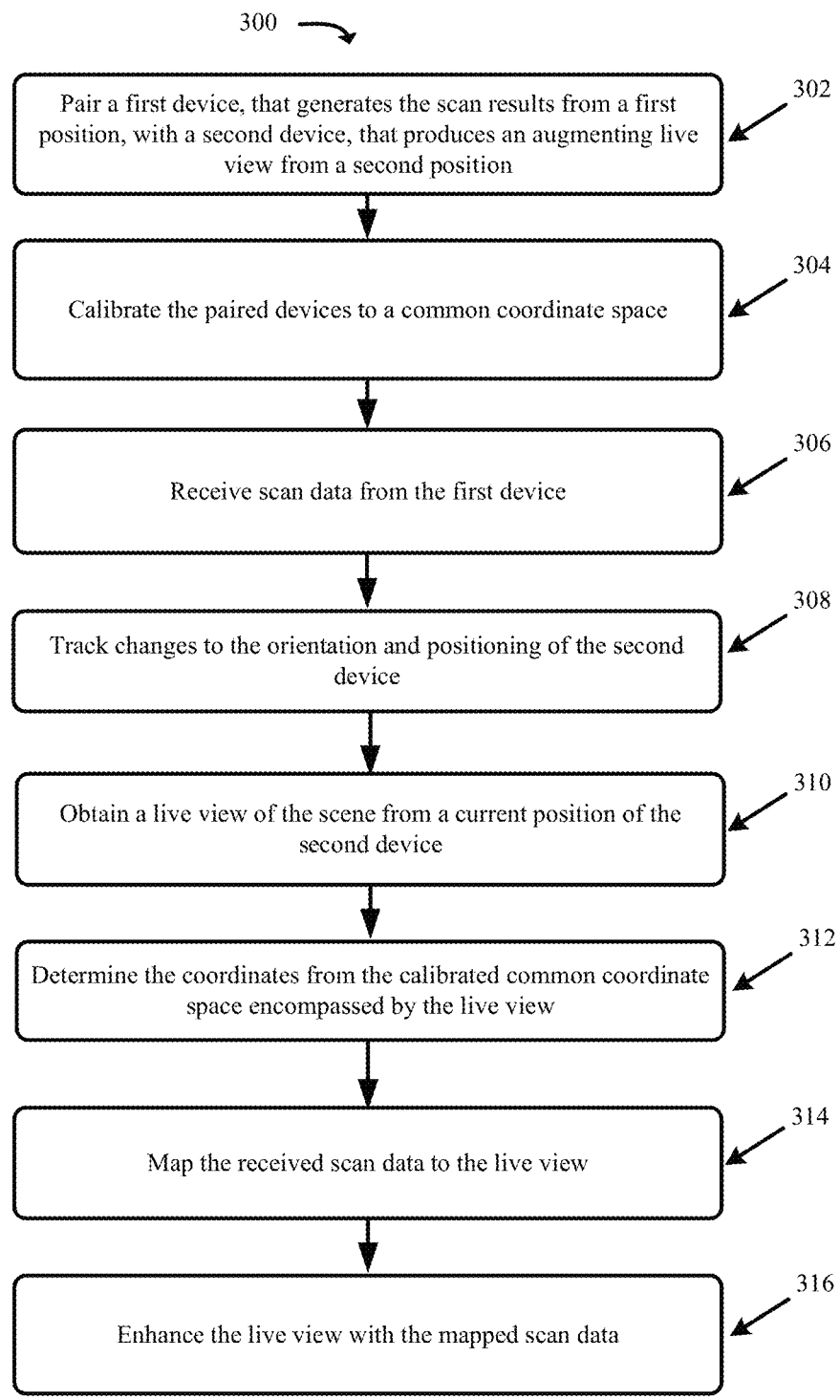
FIG. 3 presents a process for generating the augmented and/or enhanced visualization based on the relative tracking of a first device and a second device in accordance with some embodiments presented herein.

FIG. 3 presents a process 300 for generating the augmented and/or enhanced visualization based on the relative tracking of first device 101 and second device 103 in accordance with some embodiments presented herein. Process 300 is implemented by second device 103 or system device 105 that generates the augmented and/or enhanced visualization for display on second device 103.

Process 300 includes pairing (at 302) second device 103 with first device 101 that provides the scan results for augmenting the live view provided by second device 103. Pairing (at 302) devices 101 and 103 includes configuring first device 101 to generate and stream scan results to second device 103, or configuring first device 101 to generate and stream the scan results to system device 105 and second device 103 to stream the live view to system device 105. In any case, pairing (at 302) second device 103 with first device 101 includes identifying second device 103 as the source of the live view and the device that presents the augmented live view, and first device 101 as the one or more devices that provide the scan results for augmenting the live view of second device 103. In some embodiments, devices 101 and 103 are paired (at 302) using a Bluetooth, WiFi, or other wireless network connection, and devices 101 and 103 wirelessly exchange data with one another over the wireless network connection.

Process 300 includes calibrating (at 304) paired devices 101 and 103 to a common coordinate space. In some embodiments, paired devices 101 and 103 are calibrated (at 304) relative to the scene and/or objects or surface of the scene, or relative to the positioning of each device. Accordingly, calibrating (at 304) paired devices 101 and 103 includes paired devices 101 and 103 exchanging positional data with one another. For instance, first device 101 sends its positional data to second device 103. The positional data includes the orientation and/or positional coordinates for a location of first device 101.

In some embodiments, calibrating (at 304) paired devices 101 and 103 includes selecting an origin point in the scene that the positions of paired devices 101 and 103 are defined relative to and/or that the positional coordinates of the scan results are defined relative to. The origin point may correspond to a unique feature within the scene that is easily distinguished and that is visible to both devices 101 and 103 from their respective positions (e.g., first device 101 at the first position and second device 103 at the second position).

Selecting the origin point includes defining the same x, y, z coordinates for the origin point. Calibrating (at 304) further includes each device 101 and 103 determining its position relative to the origin point. For instance, the origin point may have positional coordinates (X1, Y1, Z1), first device 101 may measure its position relative to the origin point and define its position with positional coordinates (X1−10, Y1+7, Z1−2), and second device 103 may measure its position relative to the origin point and define its position with positional coordinates (X1+4, Y1−4, Z1). In other words, the first position of first device 101 is defined based on the angle and distance of first device 101 from the established origin point, and the second position of second device 103 is defined based on the angle and distance of second device 103 from the established origin point.

As a result of the calibration (at 304), first device 101 generates the scan results with positions relative to the origin position. In other words, first device 101 defines the positional coordinates for each detected point in the scene relative to the origin point.

Process 300 includes receiving (at 306) scan data from first device 101 as the first device 101 generates the scan data from a current or first position of first device 101. First device 101 streams the scan data to second device 103 as the scan data is generated by first device 101. The scan data may include point cloud data points, meshes, polygons, or other primitives that are defined with positional coordinates to represent the positioning of different points or regions of a scanned surface. The positional coordinates for each data point, mesh, polygon, or other primitive is defined relative to the origin point. To define the positional coordinates, first device 101 tracks and updates its own position relative to the origin point using its cameras and/or sensors, measures the position of each detected point or surface of the scene relative to the tracked or updated position of first device 101, and computes the positional coordinates for the detected point or surface relative to the origin point based on measured position of the detected point or surface and the tracked or updated position of first device 101. Accordingly, even if the position of first device 101 changes during the scanning of different surfaces, the positional coordinates for the primitives representing those different surfaces are defined relative to the position of the origin point. Specifically, first device 101 determines the position of a detected point relative to the current position of first device 101, and adjusts that positional measurement to account for the current position of first device 101 relative to the origin point.

Process 300 includes tracking (at 308) changes to the orientation and positioning of second device 103. In some embodiments, the cameras and/or sensors of second device 103 are used to continually track the orientation and positioning of second device 103 relative to the origin point. For instance, the cameras and/or sensors track movement and/or rotation of second device 103 after the second position of second device 103 is established so that the position of second device 103 relative to the origin point or in the calibrated (at 304) coordinate space may be determined without further reference to the origin point. For instance, IMU sensors of second device 103 may track rotation of second device 103 away from the origin point and a distance that second device 103 is moved away from the origin point so that the position of second device 103 may be updated even without the origin point falling within the field-of-view of the second device 103 cameras or sensors.

Process 300 includes obtaining (at 310) a live view of the scene from a current position of second device 103, and determining (at 312) the coordinates from the calibrated (at 304) common coordinate space encompassed by the live view. For instance, the coordinates encompassed by the live view may be computed using the current tracked position of second device 103 and the angle and depth at which the live view projects from the current tracked position of second device 103.

Process 300 includes mapping (at 314) the scan data received (at 306) from first device 101 to the live view. Mapping (at 314) the scan data may include identifying the subset of data points, polygons, meshes, and/or other primitives with positional coordinates that fall within the coordinates encompassed by the live view.

Process 300 includes enhancing (at 316) the live view with the mapped (at 314) scan data. Enhancing (at 316) the live view includes presenting the scan data over the live view at corresponding positions of the live view where that scan data was captured. Specifically, the live view may include a particular surface with a specific relative position to the origin point, and enhancing (at 316) the live view includes overlaying the particular surface with scan data that was detected, measured, and/or otherwise captured by first device 101 from the same specific relative position to the origin point. Accordingly, process 300 identifier the mapped scan data with positional coordinates that correspond to positions of surfaces within the live view, and overlays the mapped scan data over the live view of those surfaces.

Figure 4:
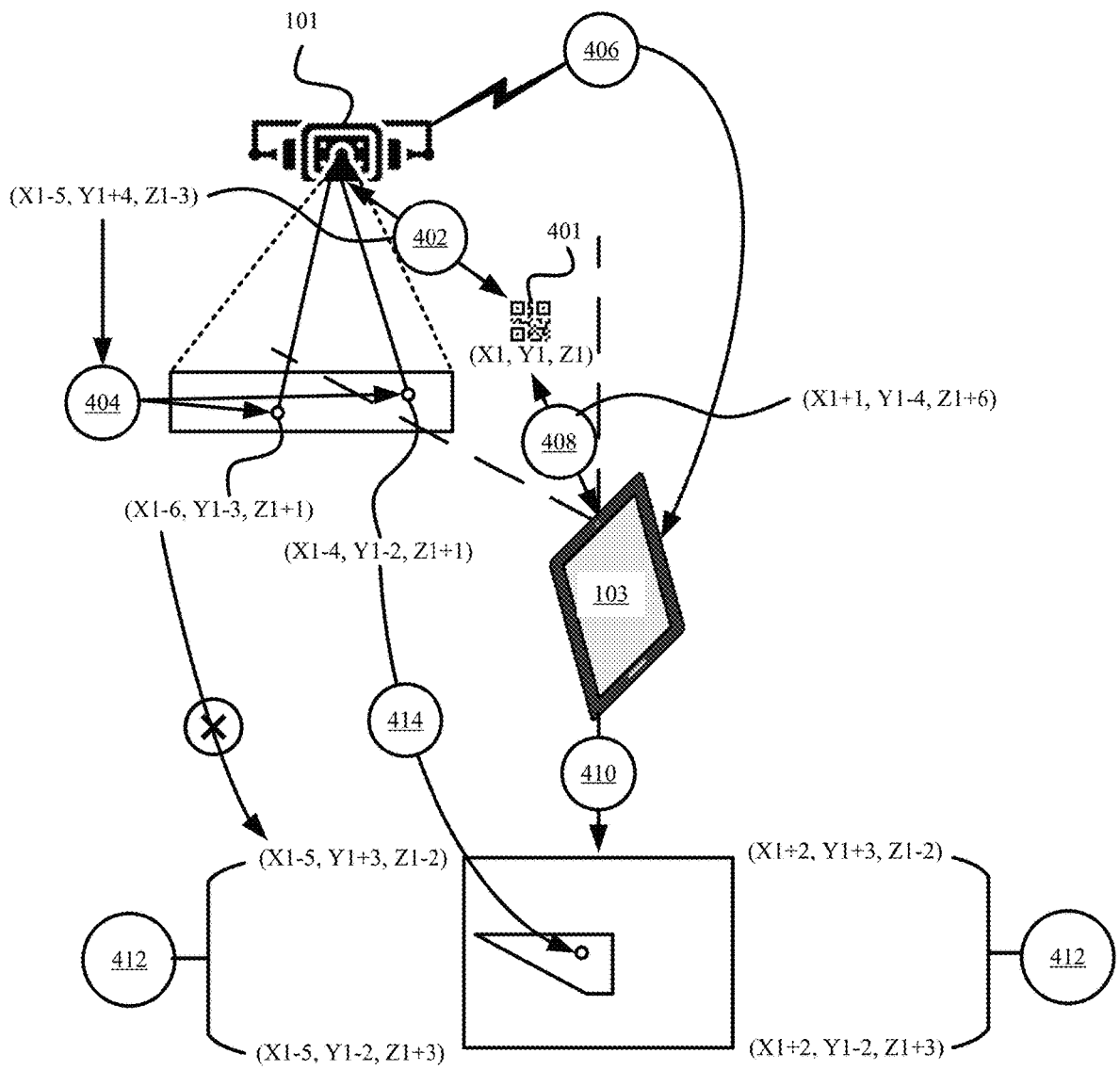
FIG. 4 illustrates an example of enhancing the live view with scan data in accordance with some embodiments presented herein.

FIG. 4 illustrates an example of enhancing the live view with scan data in accordance with some embodiments presented herein. First device 101 establishes (at 402) its position relative to origin point 401. Specifically, first device 101 determines its position within a common coordinate space based on its distance and direction from origin point 401.

First device 101 scans one or more surfaces in a scan from a first position or tracked current position, and derives (at 404) positional coordinates for different points about the one or more surfaces based on a measured distance and/or position of the different points from the tracked current position of first device 101, and based on the tracked current position of first device 101 relative to origin point 401.

First device 101 streams (at 406) the positional coordinates derived for the different points in the common coordinate space to second device 103. The common coordinate space being centered on or established relative to the position of origin point 401.

Second device 103 receives (at 406) the streamed positional coordinates, and tracks (at 408) its position relative to origin point 401. Second device 103 captures (at 410) a live view of the scene from its current tracked position, and determines (at 412) coordinates of the common coordinate space falling within the live view based on the current tracked position of second device 103 and the field-of-view that is captured from the current tracked position of second device 103.

Second device 103 augments (at 414) the live view by overlaying a subset of points, polygons, meshes, and/or other primitives from the received (at 406) scan data that have positional coordinates in the live view at the corresponding positions within the live view. In this manner, the augmented (at 414) live view provides the user with a visualization of what surfaces from the live view have been scanned, the quality of the scanned surfaces (e.g., number or density of primitives captured for different parts of the scanned surfaces), and/or parts of surfaces or entire surfaces that were not properly scanned and for which there is insufficient scan data. The user may move second device 103 to view the scan data that was captured for the surfaces of the scene from different angles or perspectives. First device 101 may then be repositioned to rescan various surfaces where gaps are evident and/or where the parts or regions that were insufficiently scanned are exposed to first device 101.

In some embodiments, paired devices 101 and 103 track their positions relative to one another. For instance, second device 103, that produces and presented the augmented live view from the scan data received from first device 101, tracks its position relative to first device 101, and adjusts the aligning of the scan data based on the relative positional tracking.

Figure 5:
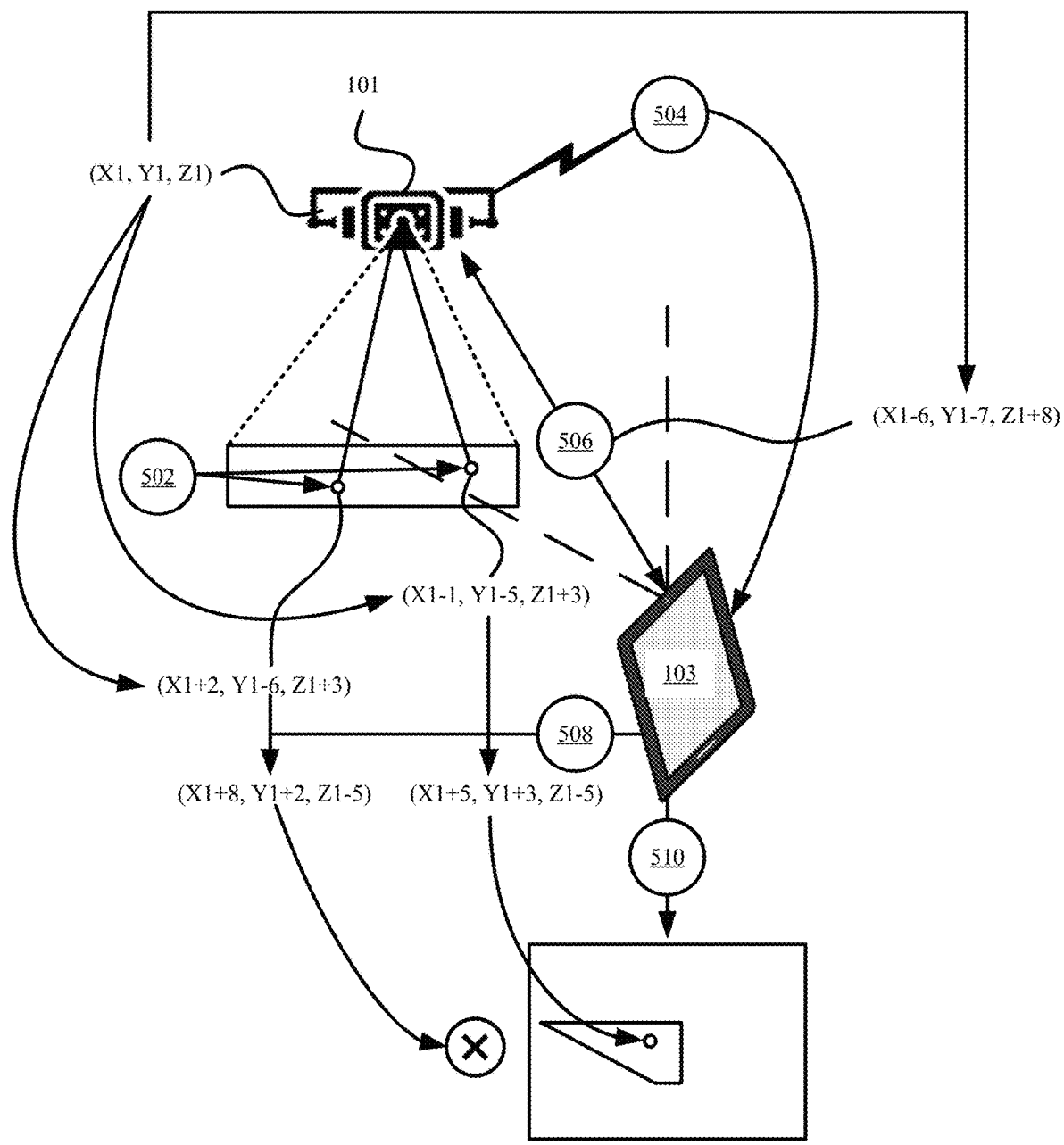
FIG. 5 illustrates an example of generating the augmented live view based on the relative positional tracking of devices in accordance with some embodiments presented herein.

FIG. 5 illustrates an example of generating the augmented live view based on the relative positional tracking of devices in accordance with some embodiments presented herein. First device 101 pairs and/or connects with second device 103.

First device 101 scans (at 502) the scene from a first position, and provides (at 504) the scan data along with its positional data to second device 103. First device 101 may measure and/or define the positional coordinates for the data points, polygons, meshes, and/or other primitives of the scan data relative to the first position from which first device 101 scans (at 502) the scene. In other words, the positional coordinates for the scanned surfaces may be defined based on their position and distance from first device 101. The positional data of first device 101 may track the orientation, rotation, and/or movement of first device 101 from or at the first position.

Second device 103 determines (at 506) its position relative to first device 101. In some embodiments, second device 103 determines (at 506) its position relative to first device 101 by using its cameras and/or sensors to detect the distance and position of first device 101 relative to second device 103. Second device 103 may supplement the relative positional tracking based on the positional data that is provided by first device 101. For instance, if first device 101 identifies its position with coordinates (X1, Y1, Z1), then second device 103 may measure the direction and distance of first device 101 from second device 103 using its cameras and sensors, and may define the positional coordinates for the second position of second device 103 as an offset from the coordinates (X1, Y1, Z1) of first device 101. In some other embodiments, second device 103 determines (at 506) its position relative to first device 101 by comparing the positional data received from first device 101 against positional data obtained from the second device 103 cameras and/or sensors. In any case, the second position of second device 103 is defined relative to the first position of first device 101.

Second device 103 receives the scan data. Second device 103 maps (at 508) the scan data to the coordinate space for the live view captured by second device 103 from the second position by adjusting the scan data positional coordinates based on the difference between the first position of first device and the second position of second device 103. In other words, second device 103 maps the positional coordinates for the field-of-view created from the second position to the coordinate space corresponding to the capture of the scene from the first position, or maps the positional coordinates corresponding to the capture of the scene from the first position to the coordinate space of the live view of the scene captured from the second position based on the tracked relative positions of first device 101 and second device 103.

Second device 103 overlays (at 510) the mapped scan data to the live view. Specifically, second device 103 augments the live view to present the scan data that is captured for various surfaces according to the first coordinate space centered on the first position onto the corresponding surfaces as imaged or captured in the second coordinate space as a result of mapping the first coordinate space to the second coordinate space based on the tracked relative positioning of first device 101 and second device 103.

The augmented live view allows a user to inspect the scan quality while the scanning is being performed. Accordingly, the user does not have to wait until the scanning is complete before being able to visualize the scan results and inspect the scan results for gaps or improperly scanned regions. The augmented live view therefore improves the scan quality and reduces the time needed to scan a scene with a desired quality.

Figure 6:
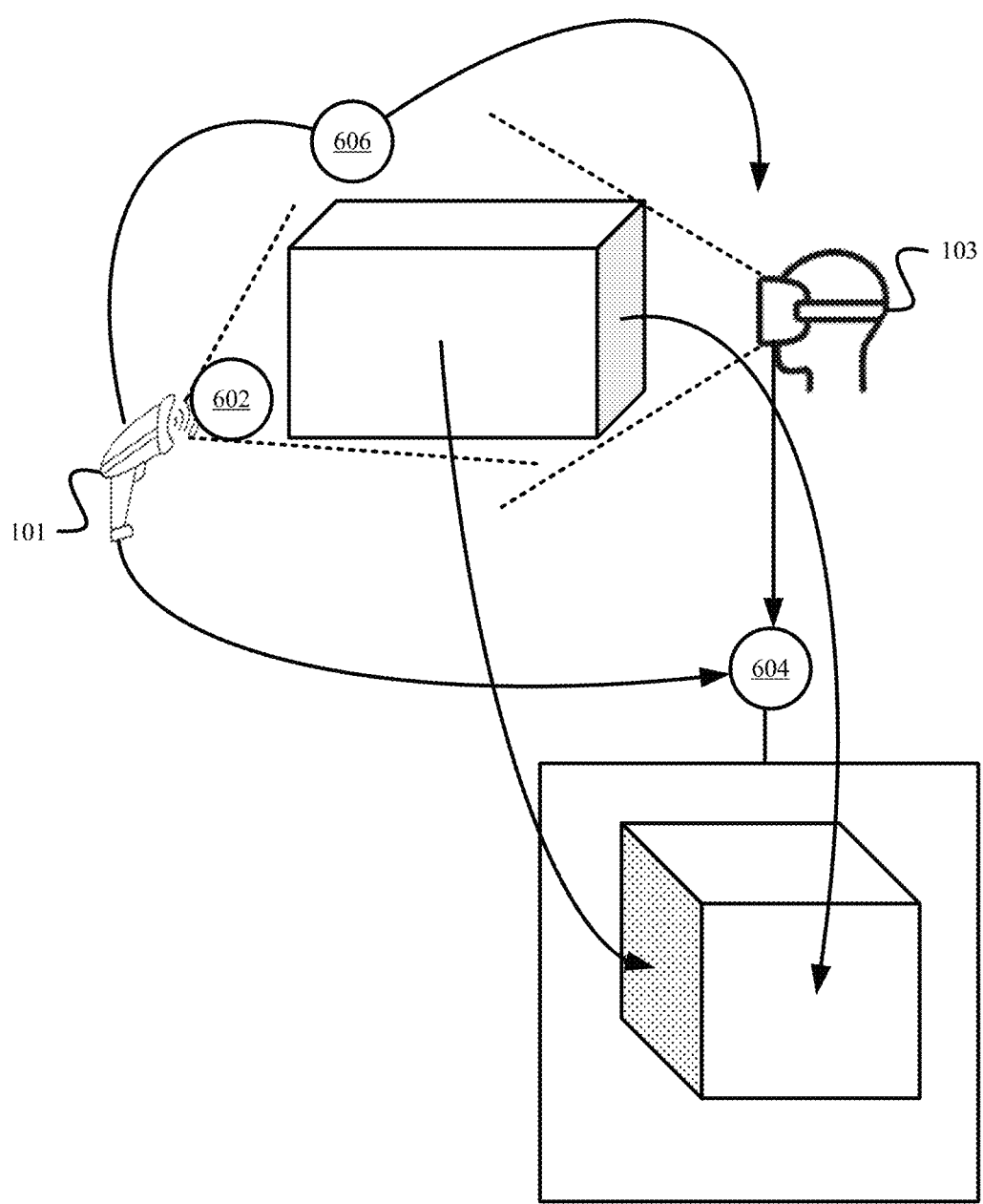
FIG. 6 illustrates an example of using the live view enhanced with scan data to optimize the scanning of a scene in accordance with some embodiments presented herein.

FIG. 6 illustrates an example of using the live view enhanced with scan data to optimize the scanning of a scene in accordance with some embodiments presented herein. A user uses first device 101 to scan (at 602) the scene from a first position, and uses second device 103 to visualize (at 604) the scan results over a live view of the scene from different positions. Specifically, the user may move to a different location in which parts of the scene are not exposed to first device 101, and may identify those parts that are not enhanced or overlaid with scan data because no scan data was generated for those parts or regions with first device 101 at the first position.

Before moving first device 101 to scan a different scene and/or before completing the scanning, the user moves (at 606) first device 101 to those parts or regions that were visualized in the display of second device 103 with no or insufficient scan data. Accordingly, second device 103 provides the user with a live view of the parts or regions with insufficient scan data so that the user is not left guessing where to place first device 101 in order to optimally expose those parts or regions to first device 101 without further obstruction.

In some embodiments, the 3 D scanning system may be expanded to enhance the live view from the perspective of second device 103 with scan data that is simultaneously captured from different first devices 101 at different locations. For instance, rather than scan an entire scene with one device that is moved to different positions, the 3 D scanning system is able to support scanning of the scene simultaneously with multiple devices at the different positions and with second device 103 generating an enhanced and/or augmented live view of the scene with the scan data that is received from the multiple devices. A director may inspect the quality of the scanning performed by each of the multiple devices from a single device or headset (e.g., second device 103) and may instruct individual scanning devices to be repositioned to complete a comprehensive 3 D scan of the scene.

Figure 7:
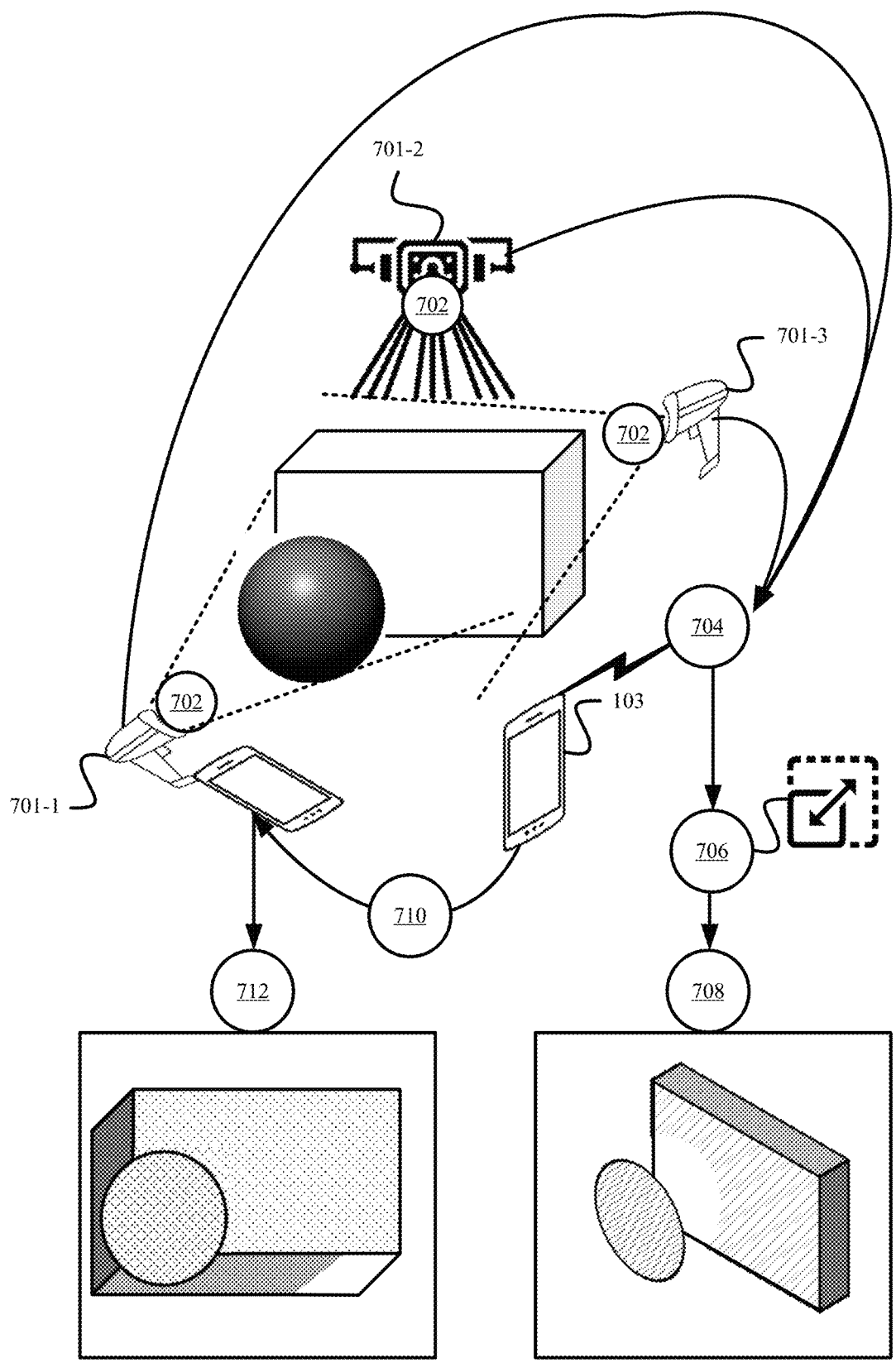
FIG. 7 illustrates an example of generating a live view of a scene that is enhanced with scan data from multiple scanning devices in accordance with some embodiments presented herein.

FIG. 7 illustrates an example of generating a live view of a scene that is enhanced with scan data from multiple scanning devices in accordance with some embodiments presented herein. Different scanning devices 701-1, 701-2, and 701-3 (hereinafter sometimes collectively refered to as scanning devices 701 or individually referred to as scanning device 701) perform (at 702) a 3 D capture or scan of the scene from different positions that expose each of the scanning devices 701 to different surfaces or that expose different parts of the same surfaces to different scanning devices 701.

Scanning devices 701 pair to second device 103. Second device 103 tracks the positioning and/or any changes to the positioning of each scanning device 701 to determine the position of each scanning device 701 relative to second device 103. Each scanning device 701 streams (at 704) and/or transmits the scan data that it generates to second device 103.

Second device 103 maps (at 706) the scan data received from each scanning device 701 to a common coordinate space using the tracked relative positioning of each scanning device 701. In some embodiments, mapping (at 706) the scan data includes adjusting the positional coordinates for the point cloud data points, meshes, polygons, and/or other constructs or primitives generated by each scanning device 701 to align with the coordinate space at which second device 103 captures or images the scene. In some embodiments, the scan data from different scanning devices 701 is already aligned and mapped to a common coordinate space when scanning devices 701 and second device 103 determine their positions relative to a unique feature or common origin point in the scene and define the positional coordinates for the scanned surfaces relative to the positioning of the unique feature or common origin point.

Second device 103 generates (at 708) the augmented live view to overlay, onto the live view, the scan data received from each scanning device 701 for data points, meshes, polygons, and/or other constructs or primitives with mapped positional coordinates that are within the coordinate space encompassed by the live view. Accordingly, the augmented live view combines the scan data from each scanning device 701 into a single visualization of the scene that is rendered from the field-of-view or perspective of second device 103. In this manner, second device 103 produces a visualization that simultaneously presents the scan data that any scanning device 701 captures for any surface in the field-of-view of second device 103. From the visualization, a user or scan analysis component of the 3 D scanning system identifies one or more regions or parts of the scene that are not scanned with a desired density or quality.

Moreover, a user may move (at 710) second device 103 to different positions, and second device 103 may generate (at 712) the augmented live view with the combined scan data from different perspectives while the scanning of the scene continues takes place using scanning devices 701. By moving second device 103, the user is able to inspect the entirety of the scene before the scanning is complete and without moving any of scanning devices 701.

Figure 8:
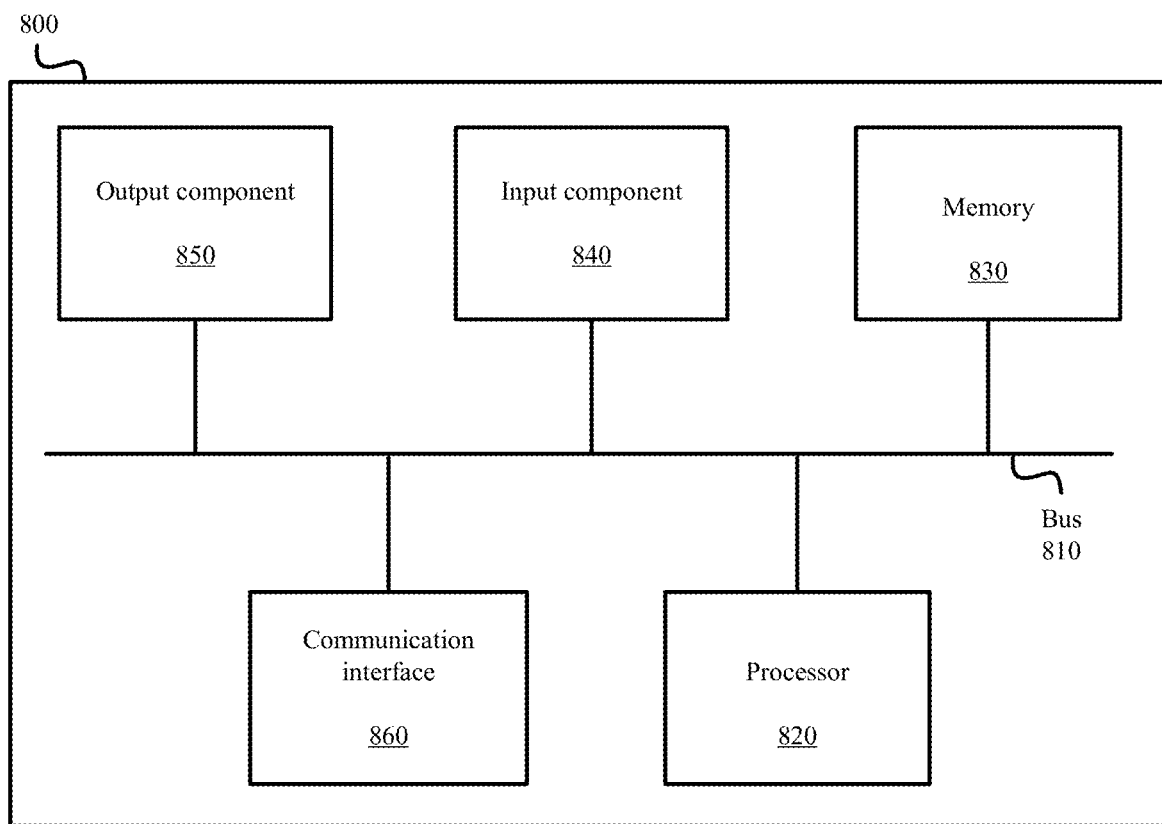
FIG. 8 illustrates example components of one or more devices, according to one or more embodiments described herein.

FIG. 8 is a diagram of example components of device 800. Device 800 may be used to implement one or more of the devices or systems described above (e.g., 3 D scanning system, first device 101, second device 103, system device 105, scanning devices 701, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
receiving, at a first device, a first position of a second device and scan data of a particular surface in a scene that the second device obtains from the first position;
determining a second position of the first device relative to the first position of the second device;
mapping the scan data to a coordinate space of the first device by adjusting the scan data based on a difference between the first position and the second position; and
generating an augmented reality view based on the mapping of the scan data, wherein generating the augmented reality view comprises:
presenting an image of the scene from the second position; and
overlaying the scan data onto a representation of the particular surface in the image based on the mapping of the scan data.

2. The method of claim 1, wherein generating the augmented reality view further comprises:
identifying the particular surface that has been scanned with the scan data overlaid onto the representation of the particular surface; and
identifying other surfaces in the scene that have not been scanned by presenting the other surfaces in the image without overlaid scan data.

3. The method of claim 1, wherein the first position comprises positional coordinates of the second device and one or more of an orientation, rotation, or movement of the second device at the first position.

4. The method of claim 1,
wherein receiving the first position of the second device comprises detecting a positional offset between the second device and the first device with a camera or sensor of the first device; and
wherein adjusting the scan data based on the difference comprises applying the positional offset to positional coordinates in the scan data.

5. The method of claim 1, wherein mapping the scan data comprises:
determining a positional offset between the first device and the second device based on the first position received from the second device and the second position of the first device; and
adjusting positional coordinates of the scan data with the positional offset.

6. The method of claim 1, wherein overlaying the scan data comprises:
determining adjusted coordinates of the scan data after adjusting the scan data based on the difference; and
presenting the scan data at positions of the adjusted coordinates in the coordinate space of the first device.

7. The method of claim 1 further comprising:
pairing the first device with the second device.

8. The method of claim 1, wherein receiving the first position and the scan data comprises:
wirelessly transmitting the first position and the scan data from the second device to the first device as the second device generates the scan data.

9. The method of claim 1 further comprising:
scanning the scene from the first position using the second device; and
presenting surfaces of the scene from the second position that have been scanned via the augmented reality view on a display of the first device that is separate and detached from the second device.

10. The method of claim 1, wherein the first device comprises a display that presents the augmented reality view, and the second device comprises a scanner that is separate from the first device.

11. The method of claim 1,
wherein the scan data comprises positional measurements obtained for different points of the particular surface; and
wherein mapping the scan data comprises applying an offset to the positional measurements based on the difference between the first position and the second position.

12. The method of claim 1 further comprising:
calibrating the second position of the first device and the first position of the second device according to a common element in the scene.

13. The method of claim 1, wherein determining the second position comprises:
detecting the second device in a field-of-view of the first device;
tracking the second position of the first device relative to a position of the second device in the field-of-view; and
wherein adjusting the scan data comprises modifying the scan data based on the position of the second device in the field-of-view.

14. A first device comprising:
a display;
a wireless transceiver; and
one or more hardware processors configured to:
receive, via the wireless transceiver, a first position of a second device and scan data of a particular surface in a scene that the second device obtains from the first position;
determine a second position of the first device relative to the first position of the second device;
map the scan data to a coordinate space of the first device by adjusting the scan data based on a difference between the first position and the second position; and
generate an augmented reality view on the display based on the mapping of the scan data, wherein generating the augmented reality view comprises:
presenting an image of the scene from the second position; and
overlaying the scan data onto a representation of the particular surface in the image based on the mapping of the scan data.

15. The first device of claim 14, wherein generating the augmented reality view further comprises:
identifying the particular surface that has been scanned with the scan data overlaid onto the representation of the particular surface; and
identifying other surfaces in the scene that have not been scanned by presenting the other surfaces in the image without overlaid scan data.

16. The first device of claim 14, wherein the first position comprises positional coordinates of the second device and one or more of an orientation, rotation, or movement of the second device at the first position.

17. The first device of claim 14,
wherein receiving the first position of the second device comprises detecting a positional offset between the second device and the first device with a camera or sensor of the first device; and wherein adjusting the scan data based on the difference comprises applying the positional offset to positional coordinates in the scan data.

18. The first device of claim 14, wherein mapping the scan data comprises:
   determining a positional offset between the first device and the second device based on the first position received from the second device and the second position of the first device; and
   adjusting positional coordinates of the scan data with the positional offset.

19. The first device of claim 14, wherein overlaying the scan data comprises:
   determining adjusted coordinates of the scan data after adjusting the scan data based on the difference; and
   presenting the scan data at positions of the adjusted coordinates in the coordinate space of the first device.

20. A non-transitory computer-readable medium storing instructions that, when executed by one or more processors of a three-dimensional ("3 D") scanning system, cause the 3 D scanning system to perform operations comprising:
   receiving, at a first device of the 3 D scanning system, a first position of a second device of the 3 D scanning system and scan data of a particular surface in a scene that the second device obtains from the first position;
   determining a second position of the first device relative to the first position of the second device;
   mapping the scan data to a coordinate space of the first device by adjusting the scan data based on a difference between the first position and the second position; and
   generating an augmented reality view based on the mapping of the scan data, wherein generating the augmented reality view comprises:
      presenting an image of the scene from the second position; and
      overlaying the scan data onto a representation of the particular surface in the image based on the mapping of the scan data.

* * * * *